Sept. 27, 1949.  H. DE HAVEN  2,483,088
TENSIONING DEVICE FOR PRODUCING A LINEAR PULL
Filed June 20, 1946
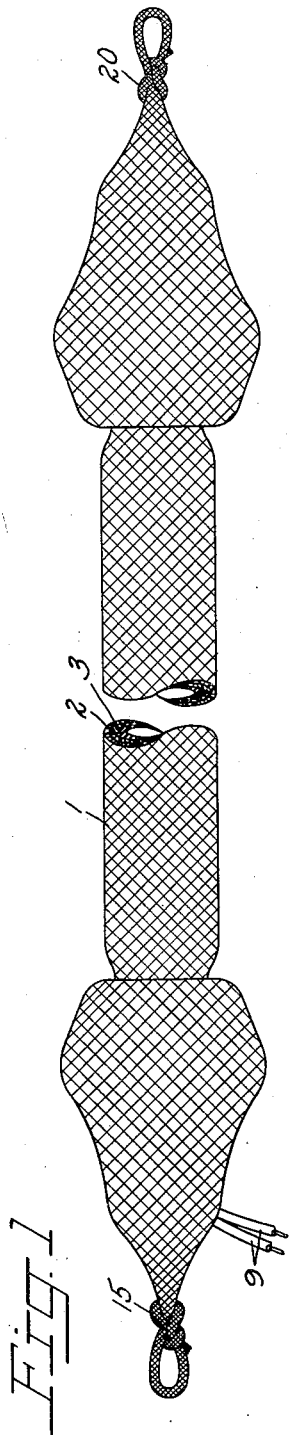
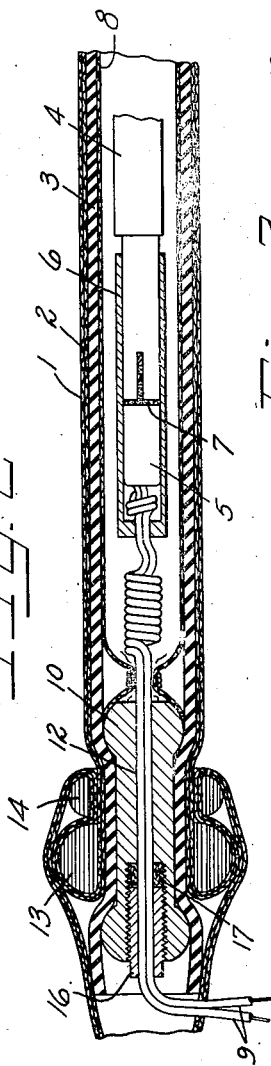
Inventor
HUGH DE HAVEN
By
Attorney Patented Sept. 27, 1949

2,483,088

UNITED STATES PATENT OFFICE 2,483,088

TENSIONING DEVICE FOR PRODUCING A LINEAR PULL

Hugh De Haven, New York, N. Y.

Application June 20, 1946, Serial No. 678,127

7 Claims. (Cl. 254—93)

The present invention relates to tensioning means, and more particularly to a device for converting fluid pressure into a tensioning force of relatively great magnitude.

The present invention is particularly adapted for use where it is desired to have a light-weight self-contained tensioning device for producing a large linear pulling force suddenly. As illustrative of such uses, the device of the present invention has been found particularly effective in connection with emergency equipment for aircraft such as crash belts and parachutes. As is well known, the deacceleration which takes place when an aircraft makes a crash landing is frequently fatal especially to the pilot unless some means is provided for arresting the pilot's fall at the moment of impact. As conventional safety belts and the like are too confining for practical usage, various devices of the spring actuated type have been proposed for engaging the pilot when triggered at the moment of impact. Such devices, however, have been found to be too slow in action and also very cumbersome and difficult to set which has rendered them generally unsatisfactory. By installing a device of the present invention as the tensioning means the requisite instantaneous action and strong force may be obtained and at the same time the device is desirably compact and of light weight. With respect to parachutes, the device of the present invention, when installed between the parachute and the load, is particularly effective for arresting the descent of the load at the instant before contact with the ground thereby cushioning the shock of landing. Here again, the compactness and light weight of the device and its ability to provide the relatively great tensioning force required instantaneously makes the device invaluable for this purpose.

In view of the advantages of the device of the present invention in that it may be made of extremely light construction, if desired, and at the same time may be utilized to obtain linear tensioning forces of relatively high magnitude which may be varied over a wide range, the use of the device in many fields will be apparent. Furthermore, the operation of the device may be readily controlled so that the tensioning action is relatively slow or fast, and the actuation of the device may be delayed or accomplished substantially instantaneously, if desired.

The foregoing and other advantages of the invention will be readily apparent from the following description of a specific embodiment of the invention shown in the accompanying drawing, in which Figure 1 is a side view of the assembled device;

Fig. 2 is a fragmentary cross sectional view of one end of the device; and

Fig. 3 is a fragmentary cross sectional view of the end of the device opposite to that shown in Fig. 2.

The device of the present invention is based on the conception that a lattice woven tube composed of strands which are interwoven or braided on the diagonal to form combined left-hand and right-hand helices may be shortened lengthwise by increasing the diameter of the tube, i. e., by expanding the tube radially. In effect, the woven tube of crossed helix strands functions like a combination of toggle joints to translate lateral into longitudinal motion. As a result of the shortening in the length of the tube, there is provided a tensioning force which is operative at the ends of the tube.

Referring to the drawing, the outer or tensioning tube 1 is composed of strands woven on the diagonal as described above to form a plurality of helices in the shape of a continuous tube or sleeving. As a result of this weaving or braiding of the strands on the diagonal in the form of a plurality of helices, the desired toggle effect is created which causes the tube to shorten when its diameter is increased. A specific example of such woven tubing or sleeving which has been used satisfactorily is the nylon braid No. Z-13438 manufactured by the Hope Webbing Company. If desired, the outer or tensioning tube 1 may be formed double by the addition of a second similar tensioning tube 2. By the use of such a multiple construction, the capacity of the device may be materially increased as desired.

It is desired to make the outer tube 1 and also any additional tensioning tubes such as the tube 2, if utilized, out of material which is of sufficient flexibility and strength, especially shock strength, to translate radially expanding pressures into tensioning forces of high magnitude. It is also desirable to select a material which is comparatively free from torsional resistance to permit free functioning of the toggle effect. As a specific example, a material which has been used satisfactorily in carrying out the invention is the well-known synthetic fiber having the trade name "nylon." Such nylon fibers or strands are readily adaptable to weaving or braiding to form the outer tubes 1 and 2 as described above and at the same time are sufficiently strong to be used in devices designed to exert tensioning forces of high magnitude and are relatively free from torsional resistance. Other suitable materials may be utilized if desired.

In order to exert a radially expanding force along the inner surfaces of the outer tubes 1 and 2, it is preferred to utilize an inner tube 3 which is expansible and which is substantially fluid-tight. The inner tube is adapted to operate in the nature of a bladder for exerting a radial force, when expanded, along substantially the entire inner surface of the outer tubes 1 and 2. The inner tube may be of rubber or the like.

The fluid pressure to be applied within the inner tube 3 is preferably applied from a source contained within the device itself. In order to provide a self-contained unit, a convenient source of fluid pressure which may be disposed within the inner tube 3 is an ignitible gas-evolving pressure-producing material, such as ordinary black gunpowder or similar material. The gunpowder may be wrapped in paper or a tape, i. e., spread out or pocketed, in any desired fashion so as to provide fast or slow burning. In the drawing, a wrapped gunpowder charge is indicated by the reference numeral 4. As is well known in the art, the characteristics of the burning also may be readily varied by varying or changing the composition of the ignitible charge. The preparation and modification of gunpowder and like charges to provide varying characteristics as to the rate of burning and the amount of pressure created is well known to one skilled in the art, and the use of all such preparations and modifications is within the scope of the invention.

For convenience in operating the device, the charge may be ignited by means of an electric squib 5 of standard manufacture which, if desired, may be positioned in a brass casing 6. To facilitate the operation of the electric squib 5, it is preferred to provide a primer 7 whereupon the remainder of the brass casing 6 may receive the wrapped powder charge 4.

In order to protect the tube 3 from the flame produced when gunpowder is ignited, the gunpowder charge 4 and the electric squib 5 may be enclosed in a sheath 8 of material which is resistant to flame and thus will act as a flame shield. Satisfactory results have been obtained, for example, by the use of a tube constructed of cotton braid which has been dipped in ammonium stearate. The ends of the flame shield or tube 8 may be tied in any convenient fashion while, at the same time, permitting the lead wires 9 of the electric squib 5 to extend therefrom.

In assembling the completed device of the present invention, the ends of the device may be sealed by means of plugs 10 and 11 which, in a preferred embodiment, are in the shape of a dumbbell. For convenience, the plug 10 has an axial bore 12 adapted to receive the lead wires 9 from the electric squib 5. The inner tube 3 and the outer tubes 1 and 2 are pulled over the plug 10 and are securely wrapped in this position by means of a wrapper 13. The wrapper 13 may comprise, for example, a length of cotton braid which is approximately three-fourths inches wide and of the order of twenty inches long. This braid is circumferentially wound about the outer tubes 1 and 2, inner tube 3, and the lower narrow portion of the plug 10 to form an annular bead therearound. The outer tubes 1 and 2 are then pulled backwardly over the bead formed by the wrapper 13 and are again bound to the plug 10 by means of a second wrapper 14 which, as a specific example, may consist of fiberglas tape of the order of one-half inch in width and approximately two feet long.

After the winding of the second wrapper 14 has been completed, the outer coverings 1 and 2 are drawn over both beads formed by the wrappers 13 and 14 and around the outer end of the plug 10 where they are securely tied as close to the plug 10 as possible, preferably in the form of a bowline knot 15.

As mentioned above, the lead wires 9 from the electric squib 5 are received through the axial bore 12 of the plug 10. In order to seal the device against loss of compression through the bore 12, it is preferred to provide the plug 10 with a threaded end plug 16 and to utilize a packing 17 composed of a suitable sealing material, such as adhesive tape. The lead wires 9 may be brought out through the external tubes of the device by inserting a sharp instrument between the strands of the outer tubes 1 and 2 to form an opening through which the lead wires may be drawn.

The opposite end of the device is formed in substantially the same way utilizing wrappers 18 and 19, and the ends of the outer tubes 1 and 2 are similarly tied in the form of a bowline knot 20. The knots 15 and 20 provide a convenient attachment means at each end of the tube by which connection can be made directly with the outer tubes 1 and 2. It is not necessary, in the embodiment shown in the drawing, to provide the dumbbell-shaped plug 11 with any openings such as in the case of the plug 10. Other means for closing the ends of the tubes may be utilized if desired, but the foregoing is given as illustrative of a practical way which will not malfunction during normal usage of the device.

It will be apparent to one skilled in the art in light of the above description that the dimensions of the device may be varied over a wide range depending upon the operating characteristics of the device which are desired and the strengths of the materials employed. For most uses, the length of the tube need not exceed about three to six feet, although the maximum size of the tube is limited merely by the strength of the materials employed. A tube having a pulled-down diameter, for example, of the order of one-half inch has been utilized satisfactorily in devices of such lengths.

Knowing the dimensions of the assembly and the angle between the diagonal elements, the amount of pull to be derived for any internal pressure may be readily calculated and may be checked experimentally for any given device if desired. In the specific examples given above, a charge of as little as about one to three grams of gunpowder per linear foot will be sufficient to provide a tensioning force of high magnitude.

With a device constructed as described above, it is possible to obtain a decrease in length of about thirty percent and to obtain an initial tensioning pull of about 1500 pounds with a gas pressure of the order of 400 pounds per square inch. Despite the very great tensioning force provided by the device, however, it may be of very light weight such as, for example, nine ounces for a three foot unit.

When a gunpowder charge is utilized, the device may be actuated in a matter of two to three thousandths of a second by the electric squib, which, in view of the light weight of the device, has made the device particularly adaptable for use with parachutes and landing equipment as described above.

In view of the above description of a specific embodiment of the invention, it will be apparent that the device will be susceptible to variation by one skilled in the art, and all such variations are intended to be included within the scope of the invention.

I claim as my invention:

1. A tensioning device for producing a linear pull comprising an outer tube of strands woven on the diagonal to form a plurality of helices, an expansible substantially gas-proof inner tube confined within said outer tube, a source of gaseous pressure within said inner tube comprising a charge of ignitible gas producing material, means for igniting said material, and attaching means on the ends of the outer tube.

2. A tensioning device for producing a linear pull comprising an outer tube of strands woven on the diagonal to form a plurality of helices, an expansible substantially gas-proof inner tube confined within said outer tube, a source of gaseous pressure within said inner tube comprising a charge of gunpowder, means for igniting said charge, and attaching means on the ends of the outer tube.

3. A tensioning device for producing a linear pull comprising an outer tube of strands woven on the diagonal to form a plurality of helices, an expansible substantially gas-proof inner tube confined within said outer tube, a source of gaseous pressure within said inner tube comprising a charge of ignitible gas-producing material, a flame resistant covering substantially enclosing said charge, means for igniting the charge, and attaching means on the ends of the outer tube.

4. A tensioning device for producing a linear pull comprising an outer tube composed of strands woven on the diagonal to form a plurality of helices, an inner tube of expansible substantially fluid-proof material, a pair of plugs closing the ends of said tubes and securely attached thereto, connecting means secured to each end of the outer tube, a source of gaseous pressure, means extending through one of said plugs for effectuating the release of gas from said source within the inner tube, and attaching means on the ends of the outer tube.

5. A tensioning device for producing a linear pull comprising an outer tube composed of strands woven on the diagonal to form a plurality of helices, an inner tube of expansible substantially fluid-proof material, a pair of plugs of dumbbell shape extending into the ends of said tubes, said tubes being wrapped around and bound to the narrow sections of the dumbbell plugs by means of binding tapes circumferentially wound therearound, a source of gaseous pressure within said inner tube comprising a charge of ignitible gas-producing material, means extending through one of said plugs for igniting said charge, and attaching means on the ends of the outer tube.

6. A tensioning device for producing a linear pull comprising an outer tube formed of strands woven on the diagonal to provide a plurality of helices, an expansible, substantially gas-proof inner tube inside said outer tube, means for creating a substantially instantaneous gaseous pressure within said inner tube to effect a sudden linear contraction of the device, and attaching means on the ends of the outer tube.

7. A tensioning device comprising an outer tube formed of strands woven on the diagonal in the form of a plurality of helices, an inner tube adapted to be inflated by gaseous pressure and disposed within said outer tube for radially expanding the outer tube thereby shortening its length, and means for creating a substantially instantaneous gaseous pressure within said inner tube, said outer tube being extended beyond the ends of the inner tube to form attaching means at each end of the tube.

HUGH DE HAVEN.

REFERENCES CITED

The following references are of record in the file of this patent:

UNITED STATES PATENTS

| Number | Name | Date |
|---|---|---|
| 814,472 | Noonan | Mar. 6, 1906 |
| 2,211,478 | Pierce | Aug. 13, 1940 |